US005990901A

United States Patent [19]
Lawton et al.

[11] Patent Number: 5,990,901
[45] Date of Patent: Nov. 23, 1999

[54] MODEL BASED IMAGE EDITING AND CORRECTION

[75] Inventors: Daryl T. Lawton, Bellevue; John A. Monson, Fall City, both of Wash.

[73] Assignee: Microsoft Corporation, Redmond, Wash.

[21] Appl. No.: 08/883,718

[22] Filed: Jun. 27, 1997

[51] Int. Cl.$^6$ .................................................. G06T 17/20
[52] U.S. Cl. .......................................... 345/429; 382/115
[58] Field of Search .................................... 345/429–432, 345/433, 434, 435; 382/115–118, 308, 311

[56] References Cited

U.S. PATENT DOCUMENTS

| | | |
|---|---|---|
| 5,130,789 | 7/1992 | Dobbs et al. . |
| 5,247,610 | 9/1993 | Oshima et al. .......................... 345/435 |
| 5,432,863 | 7/1995 | Benati et al. . |
| 5,805,745 | 9/1998 | Graf ........................................ 382/291 |
| 5,825,941 | 10/1998 | Linford et al. .......................... 382/294 |

OTHER PUBLICATIONS

Four separate screen shots (four sheets) from Adobe PhotoDeluxe (Version 1.0) showing steps to remove red eye.
LivePix 1.0 screen shot entitled "Owen standing in crib with red eye" and help topic on Remove red eye from a photo. (2 pages).
Adobe Photoshop® version 4.0 User Guide including Table of Contents and selected pages.
Akamatsu, et al., "An Accurate and Robust Face Identification Scheme," *IEEE*, 217–220 (1992).
Brunelli, et al., "Caricatural Effects in Automated Face Perception," *Biological Cybernetics*, 69, 235–241 (1993).
Chen, et al., "Human Face Recognition From a Single Front View," *International Journal of Pattern Recognition and Artificial Intelligence*, 6 (4), 571–593 (1992).
Chow, et al., "Towards a System for Automatic Facial Feature Detection," *Pattern Recognition*, 26 (12), 1739–1755 (1993).
Huang, et al., "Automatic Feature Point Extraction on a Human Face in Model–Based Image Coding," *Optical Engineering*, 32 (7), 1571–1580 (1993).
Huang, et al., "Human Facial Feature Extraction for Face Interpretation and Recognition," *IEEE*, 204–207 (1992).
Huang, et al, "Human Facial Feature Extration for Face Interpretation and Recognition," *Pattern Recognition*, 25 (12), 1435–1444 (1992).
Kamel, et al., "System for the Recognition of Human Faces," *IBM Systems Journal*, 32 (2), 307–320 (1993).
Samal, et al., "Automatic Recognition and Analysis of Human Faces and Facial Expressions: A Survey," *Pattern Recognition*, 25 (1), 65–77 (1992).

*Primary Examiner*—Mark R. Powell
*Assistant Examiner*—Thu Nguyen
*Attorney, Agent, or Firm*—Leydig, Voit & Mayer, Ltd.

[57] ABSTRACT

A system and method is described for automatically editing digital images. An image to be edited is selected and registered with a model that is an abstract of features and attributes common to a category of images to which the selected image belongs. In the illustrated embodiment, a human face is used as an example of an image to be edited and the matching model is a representation of features and attributes common to all human faces. Many other images of objects may also be edited using the techniques of the invention, as long as a general class of objects to which an image belongs is amenable to being represented by a model comprising a set of common features or attributes. A library of different models is available to the user for selecting the model matching the image to be edited. The library includes different models of the same object in different orientations and may also include models of different objects. After the appropriate model is selected, the user is prompted to register the details of the selected image with the generalized features and attributes of the selected model. Editing processes or tools, which are linked to the model, are then automatically appled to the image in order to perform a desired editing function. In addition to applying editing techniques to existing images in a larger image, the invention enables a user to paste and blend images into another, larger image—e.g., create a morphing effect by pasting one persons head over the head of another in an original image.

40 Claims, 11 Drawing Sheets

MODEL BASED IMAGE EDITING AND CORRECTION

TECHNICAL FIELD

The invention is generally directed to digital image processing and, more specifically, to digital image processing techniques for enhancing an image, adding objects to the image and implementing special effects and photographic corrections.

BACKGROUND OF THE INVENTION

Digital image processing has become a significant form of image processing because of continuing improvements in techniques and increasingly powerful hardware devices. Digital image processing techniques have augmented and, in some cases, replaced methods used by photographers in image composition and dark room processing. For example, digital image processing techniques such as contrast balancing, edge sharpening, color balancing or retouching of defects are employed for editing original photographic images. Moreover, with the aid of a computer, digitized images can be edited to achieve a variety of effects such as changing the shapes and colors of objects and forming composite images.

Until recently, real-time editing of digital graphic images was feasible only on expensive high-performance workstations with dedicated, special-purpose, hardware. The progress of integrated circuit technology in recent years has produced microprocessors with significantly improved processing power and has also reduced the costs of computer memories. These developments have made it feasible to implement advanced graphic editing techniques in personal computers. These editing techniques, however, are typically complex and require a technical and/or artistic expertise beyond that of ordinary users of personal computers.

For example, image compositing is a digital image processing technique that merges unrelated objects from multiple images. The result is a new scene that may never have existed physically. Image compositing has gained widespread use in photography. Image compositing operations, however, typically require a complex procedure for compositing the various images in order to achieve the desired effect. Thus, although the standard PC of today is capable of implementing these complex procedures, the average user is not.

Another common digital image processing technique is geometric transformations, which reposition pixels within an image. Using a mathematical transformation, pixels are relocated from their (x,y) spatial coordinates in the input image to a new coordinate in the output image. Geometric transformations are used to change the color of an object or to move, spin, size and arbitrarily contort its geometry. In digital photography these transformations are typically used to implement touch-up techniques such as correcting distortions in an image, as well as adding visual effects. Like image compositing, geometric transformations can be done on a PC platform. However, employing these transformations requires an expertise that is beyond that of the average user.

Well known computer vision and pattern recognition techniques involves automatic registering of a model with an image. Also, head models have been proposed for low-bandwidth video communication. For example, someone's head is mapped to a 3D-head model and then only the parameters of the model are sent. Similar head models have also been used in proposed face recognition systems. These type of model registration techniques, however, are unavailable for imaging processing and editing.

There is a need for a digital imaging processing system in which techniques such as those described above and others can be applied to an image without requiring either technical or artistic skills. Such a system would allow a user to directly edit images without requiring the aid of a specialist.

SUMMARY OF THE INVENTION

The present invention provides for the automatic application of digital image editing effects to a selected object in a digital image. Attributes of the object to be edited are interactively registered with the corresponding attributes in an abstract model of the type of object. An editing effect is then automatically applied to the selected object, using the constraints determined by the properties of the model and the registered attributes.

Models include both two and three-dimensional information. In two dimensions, models correspond to different views of an object. These are represented as two dimensional, relational graphs expressed in terms of junctions, boundaries and regions and a small set of spatial relations. These two dimensional models can be superimposed on a image and deformed in the same manner as a image, but the components of the model are geometrical objects with procedural attachments for performing different editing operations. Models also include three dimensional information, either in the form of a three dimensional object model that can be directly manipulated to produce a two dimensional view or as a set of distinct two dimensional models each of which corresponds to a different view of the three dimensional object at a selected orientation.

To register a model with an object in an image, the user first selects the view corresponding to a two dimensional model. This can be done in two different ways: either with through direct manipulation of a 3D model until it is at the same orientation as the object and a corresponding 2D model is generated or by selecting from a set of different views. Once the model orientation has been selected, a process is initiated for prompting a user to locate attributes in the object that match the attributes in the model. In the model, the attributes to be directly registered with the object in the original image are represented by nodes that define distinct points along a boundary, such as discontinuities and local maxima of curvature.

Once the nodes are mapped to locations in the original image, the attributes are warped to the size and orientation of the object reflected by the spatial placement of the nodes in the image and the internal constraints in the model. Also, the number and type of nodes may be dynamically determined to match the expected detail in the image based on the approximate size of the object to be edited, which can be estimated from the spatial separation of the locations in the original image mapped to the first few nodes.

Once the attributes of the model are registered with the like attributes of the object to be edited, one or more editing processes linked to the model are automatically applied to the object in order to create an edited image without any further input from the user. Since the application of the editing effect by the editing tool is constrained by the attributes of the model, the editing of the object and surrounding areas of the original image is controlled by the mapping of the attributes of the model to locations in the original image containing the object.

Virtually any type of editing technique can be automatically applied to an object in an image registered to a model in accordance with the invention. An example of one type of editing technique is morphing objects from one set of attributes to another set of attributes that are visual distinct from the first set—e.g., pasting one person's head over another person's head that is part of the original image. Another type of editing technique is correcting flaws in an image—e.g., correcting for awkward facial expressions resulting from an unusual instantaneous positioning of the mouth or eyes at the time a photographic image was taken. This type of editing may include pasting of pre-stored or standard images of objects such as facial features over the object to be edited. These pre-stored images are associated with the editing processes and are automatically pasted into the original image based on the registration of the object to the model. In order to blend the pasted image into the surrounding areas of the original image, the automatically applied editing processes or tools include procedures for operations such as gradient extraction and filling, texture mapping, boundary blending, shading and compositing. If the object to be edited is partially occluded, the boundary of the occlusion is marked to indicate compositing constraints on ordering the original image and the correction to be inserted.

Additional features and advantages of the invention will be made apparent from the following detailed description of an illustrated embodiment which proceeds with reference to the accompanying drawings.

BRIEF DESCRIPTION OF THE DRAWINGS

FIGS. 6–9 are illustrations of a series of exemplary graphical user interfaces for prompting a user to first select a model and then register it with an image to be edited, wherein FIG. 6 illustrates a cascaded series of menus in a hierarchical and nested arrangement that leads the user to select a specific editing technique, which is associated with a particular one of the models in the library of models;

FIG. 7 illustrates an array of two-dimensional projections of a three-dimensional model for a human head, one of which is selected by a user as best matching an object to be edited in the original image, FIG. 8 is an alternative user interface for selecting one of the two-dimensional projections of the three-dimensional model for a human head in which the several available projections are alternatively displayed in response to user inputs, and FIG. 9 is an illustration of the selected two-dimensional projection from FIGS. 7 or 8, which includes a sequence of flashing dots for prompting the user to identify the locations of attributes in the image to be edited that correspond to the locations of like attributes in the model demarked by the flashing dots;

DETAILED DESCRIPTION OF THE PREFERRED EMBODIMENT

Figure 1:
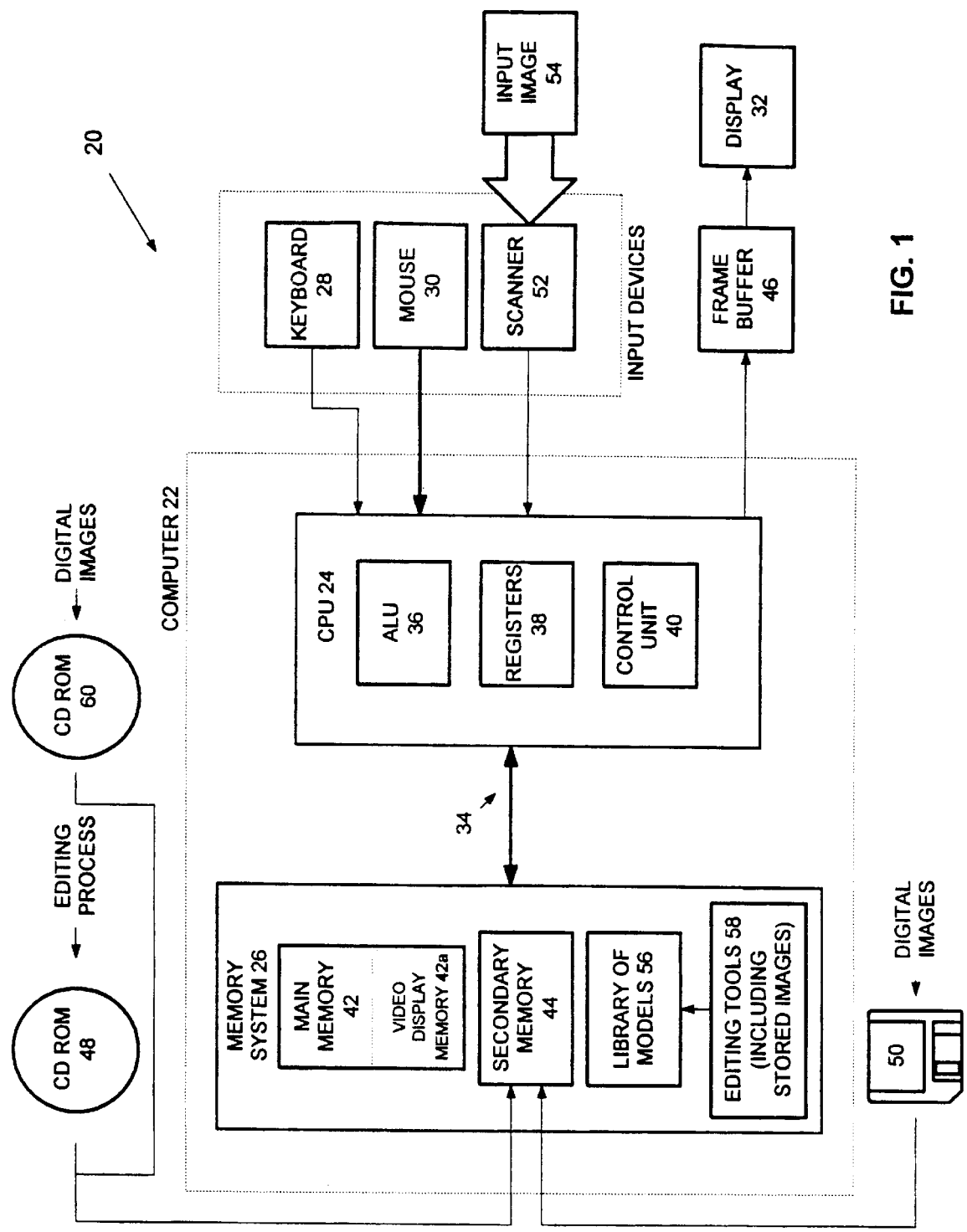
FIG. 1 is a block diagram of an exemplary computer system for editing digital images in accordance with the invention.

Turning to the drawings and referring first to FIG. 1, a computer system 20 includes a computer 22 having a central processing unit (CPU) 24, a memory system 26, and various input and output devices such as a keyboard 28, a mouse or pointer 30 and a display monitor 32. These elements are interconnected by at least one bus structure 34. CPU 24 includes a conventional arithmetic logic unit (ALU) 36 for performing computations, a collection of registers 38 for temporary storage of data and instructions, and a control unit 40 for controlling operation of the system 20. The CPU 24 may be a processor having any of a variety of architectures, including X86 from Intel and others and the Power PC from IBM and Motorola. The detailed architecture of the computer system 20 is preferably that of a conventional "personal computer," based on the architecture of the IBM PC or the Apple Macintosh and, therefore, is not described in detail herein.

The computer system 20 includes an operating system resident in the memory system 26, which is for example the WINDOWS 95 or WINDOWS NT operating system by Microsoft Corporation. The memory system 26 generally includes a main memory 42, which typically comprises a random access memory (RAM) and read only memory (ROM). Secondary memory 44 is typically in the form of long-term storage mediums such as floppy disks, hard disks, tape, CD-ROM, flash memory and other devices that store data using electrical, magnetic, optical or other recording media. The main memory 42 also includes video display memory 42a for displaying graphical images through the video display monitor 32.

In the computer architecture shown in FIG. 1, an image to be processed in accordance with the invention is in the form of an image file held in the video display memory 42a of the main memory 42, which may for example be in a FlashPix format. In order to display the image, the CPU 24 loads the image into the frame buffer 46 for the display monitor 32. In a conventional manner, the image in the frame buffer 46 is used to periodically refresh the image displayed on the video display monitor 32.

Editing of the digital image file is accomplished by the CPU 24. The edited image is saved in the memory system 26 as a new image file for future use or for transport to another digital image processing system. For example, the image file can be sent to a remote site by way of a modem connection or it can be sent to a printer connected to the computer system 20. The FlashPix standard provides a protocol for uniform transmitting and receiving of these graphical image files.

Pictures to be edited are loaded into the memory system 26 through conventional input devices. In the illustrated embodiment, pictures are input to the memory system 26 by way of three alternative input devices—i.e., a CD-ROM 48, a floppy disk 50 and a scanner 52. Pictures stored on the CD-ROM 48 or the floppy disk 50 are in digital form and preferably conform to the FlashPix standard. The scanner 52 takes existing prints 54 and converts them to digital files that also preferably conform to the FlashPix format.

In accordance with one important aspect of the invention, the memory system 26 includes a library of object models 56 that are registered with objects in images stored in the video display memory 42a in order to facilitate application of editing techniques to the images. Editing tools 58 in the memory system 26 are linked to attributes of the object models in the library 56. The user of the computer system 20 registers attributes of an object in an image to be edited with the attributes of a selected one of the models from the library 56, which provides essential information to the editing tools 58 for enabling them to automatically execute an editing function on the object. The editing function may be either a conventional function such as contrast or tint corrections or it may be an editing function uniquely enabled by the use of the models—e.g., changing the color of the iris of an eye or correcting a "red eye" effect in an original photograph (see copending U.S. application No. 08/884,207 Attorney Docket No. 75534). Also, as explained in greater detail hereinafter, the editing tools 58 may include pre-stored images that are pasted into the image, either over the object being edited for a morphing or image correction effect or simply compositing images by adding an object to the image that was not part of the original image.

The present invention is described below with reference to acts and symbolic representations of operations that are performed by the computer system 20, unless indicated otherwise. Such acts and operations are sometimes referred to as being computer-executed. In a well known and conventional manner, these acts and operations are dictated by program files, some or all of which are maintained in CD-ROM 60 or other parts of the secondary memory 44. Those skilled in the art of computer systems will appreciate that the acts and symbolically represented operations referred to herein include the manipulation by the CPU 24 of electrical signals representing data in a structured form. This manipulation transforms these data or maintains them at locations in the memory system 26, which reconfigures or otherwise alters the operation of the computer system 20 in a manner well understood by those skilled in the art of computer systems. The data structures where data are maintained are physical locations of the memory that have particular properties defined by the format of the data.

Figure 2:
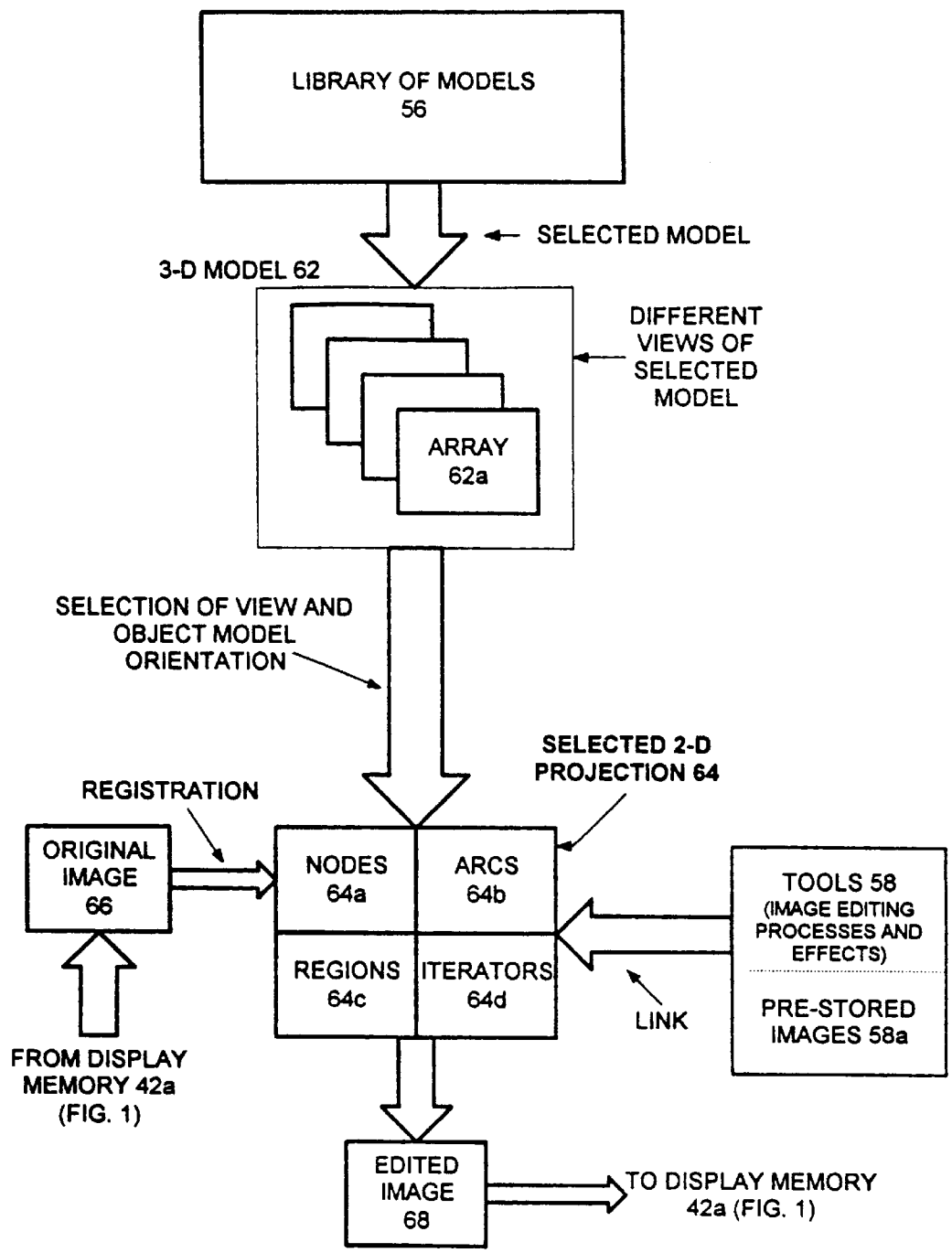
FIG. 2 is a block diagram illustrating the selection of a model object from a library of models of objects, whose attributes of the selected model are registered to like attributes in the image to be edited in order to automate the editing of the image in accordance with the invention.

Referring to FIG. 2, the library of models 56 comprises a plurality of three-dimensional models, each of the models 62 being associated with one or more of the digital image processing techniques or tools 58. Each of the models 62 in the library 56 may also be linked to a pre-stored image 58a if the editing tool 58 creates a composite image as explained in greater detail hereinafter.

Each of the models in the library 56 is a three-dimensional model 62 with attached two-dimensional attributes 64. The relationship between the three-dimensional model 62 and the two-dimensional attributes 64 can be realized in two alternative forms. In one form, the three-dimensional object model 62a is oriented, scaled and projected to yield the two-dimensional attributes 64 as a two-dimensional object, which is then interactively registered with the two-dimensional array of the original image 66 held in the display memory 42a. In another form, the three-dimensional array 62a comprises a set of two-dimensional projections forming a partitioned view sphere representing the views of the object from different directions. The three-dimensional model 62 can be thought of as being positioned in the center of the sphere. The surface of the sphere is partitioned into areas with each area corresponding to one of the two-dimensional projections of the array 62a, which describes the appearance of the model from a particular viewing direction.

In keeping with the invention, the models are not themselves high quality images. To the contrary, the models can be quite abstract and cartoon-like because they are only used for recognition and directing the application of editing effects. In this regard, the models are not like those used for graphic rendering. Models used for graphic rendering are very realistic, with near photographic detail, which is needed since the entire image is generated from information in the model. In the invention, the details of the edited image come from the image itself once the model is registered with the image. Thus, each of the models needs only be an abstraction that provides a framework of features and attributes common to all images represented by the model, which are registered with the details of an existing image.

Regardless of how they are obtained, the two-dimensional attributes 64 of the model 62 preferably consist of nodes 64a, arcs 64b, regions 64c and iterators 64d.

The nodes 64a correspond to the locations of key attributes of the model 62 that the user manually registers to the object in the image 66 to be edited by way of an interactive prompting mechanism described hereinafter.

The arcs 64b are curves described by piecewise curves, which define the boundaries of standard attributes of the model object 62.

Closed cycles of the arcs 64b define the inside or outside borders of standard regions 64c of the object model 62, which are the third attribute of the two-dimensional model 64. These standard regions 64c are either the area inside a closed cycle of the arcs 64b or a border area surrounding the outside of a closed cycle of arcs. The nodes 64a generally correspond to points of maximal or discontinuous curvature along the arcs 64b, but they can also be used to indicate positions within the regions 64c such as the center of a region.

The fourth attribute of the two-dimensional model 64 comprises iterators 64d, which are used to identify pixels adjacent the nodes 64a, arcs 64b and regions 64c. An iterator supplies successive image positions necessary for the application of an editing effect. For example, typical example of iterators can provide the successive image locations and the corresponding image values along a curve; surrounding a point; on either side of a boundary; inside a region; and the corresponding locations for several other shapes and directions. The editing tools 58 associated with the model 62 perform shading and blending functions that employ information describing these adjacent pixels, which is obtained through the application of the iterators 64d to the pixel locations of the object in the original image 66.

Mapping of the arcs 64b, regions 64c and iterators 64d to the original image 66 is dependent on the manual registration of the nodes 64a to pixel locations in the original image 66. In this regard, the data structures for registering the selected model 62 to the object to be edited is a simple map relating a pixel in an original image 66 to a location in a grid (FIG. 7) that comprises the two-dimensional projection 64 of the model's attributes.

Once the user registers the nodes 64a to the original image 66, the arcs 64b, regions 64c and iterators 64d are automatically registered in accordance with the modeled relationship between the nodes, arcs, regions and iterators. In accordance with the invention, after the model 62 is registered with the original image 66, the editing tool or tools 58 are automatically executed, resulting in an edited image 68. The edited image 68 resides in the video display memory 42a and is used to update the frame buffer so that the edited image is displayed to the user. If the edited image 68 displays the effect desired by the user in making the edit, the edited image can be then saved as a new image or it can replace the original image 66.

Figure 3:
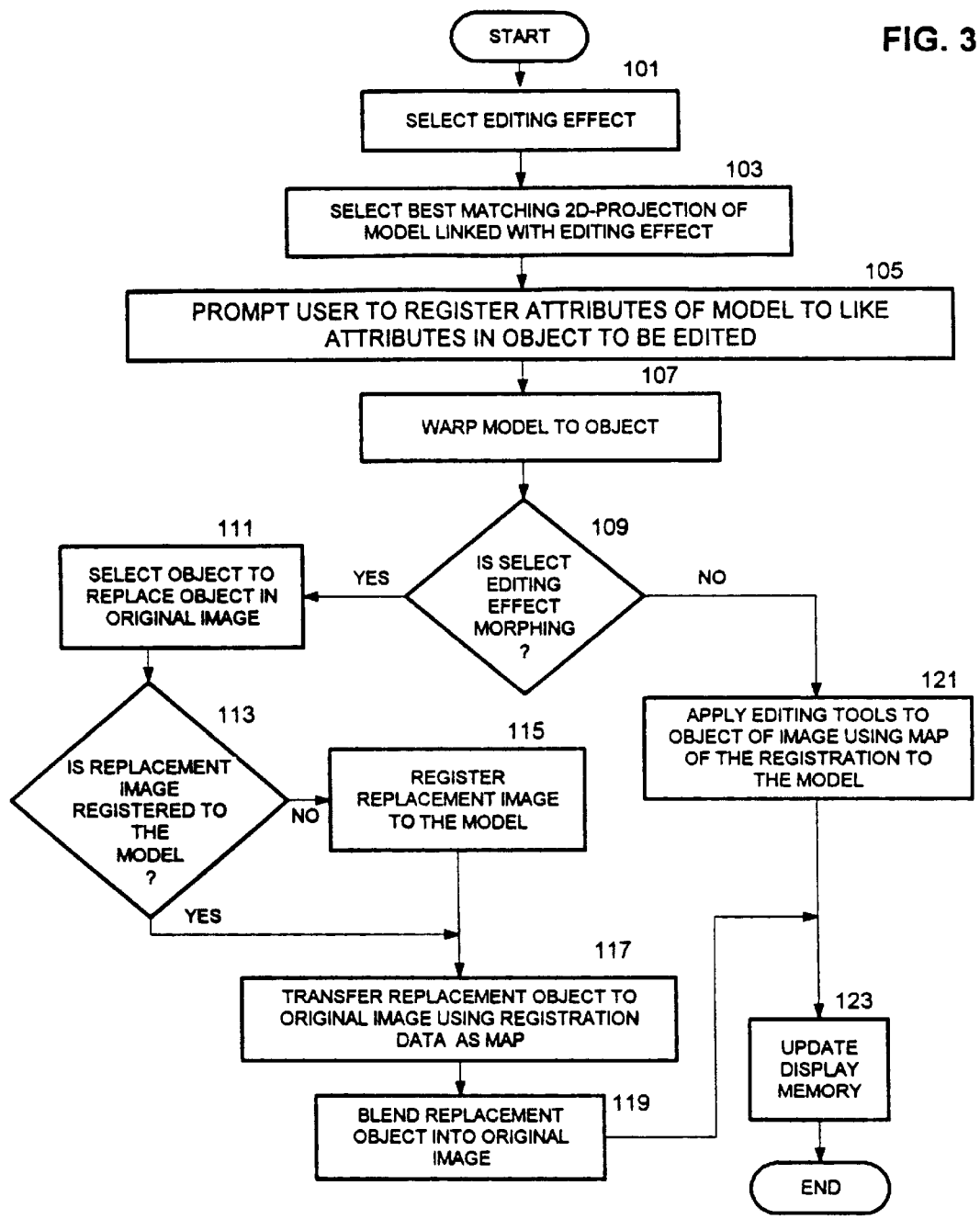
FIG. 3 is a flow diagram for an editing operation in accordance with the invention in which an editing process or tool is automatically applied to a selected object in an original digital image using the registered attributes of the model to control the editing process.

Turning to the flow diagram of FIG. 3, the editing process proceeds from an initial step 101 of selecting an editing effect to be executed on an object in the original image 66 through a series of user interface prompts that direct the user to select the appropriate one of the models 62 and one of its two-dimensional projections 64, which is then used as a map to automatically apply an editing tool to the object. In keeping with the invention, at step 101 of the flow diagram of FIG. 3, the user interface displays a menu of alternative editing techniques that can be applied through one of the models 62 in the library 56. In response to the user selecting a desired editing technique, the user interface presents at step 103 a representation the three-dimensional model associated with the selected editing effect. The representation includes a mechanism to prompt the user to select the two-dimensional projection 64 of the three-dimensional model that best matches the orientation of the object to be edited in the original image 66. The user interface may include a prompt for requesting detailed attributes of the object to be edited that can be taken into consideration by appropriate tailoring of the two-dimensional attributes 64 of the selected model 62. For example, the user interface may query the user about specific facial attributes if a head is the selected three-dimensional model 62—e.g., adding glasses or a beard to the model.

With the model 62 and one of its two-dimensional projections 64 selected, the user interface prompts the user to register the attributes or features of the two-dimensional projection 64 with the object to be edited in the original image 66. The prompt preferably includes a representation of the model 62 in which a sequence of flashing colored dots identify to the user the attributes of the model. The dots correspond to the nodes 64a of the two-dimensional projection 64. Each of the flashing dots identifies an attribute of the model 62 that is to be matched to the same attribute in the original image 66. For example, when the selected model 62 is a mouth, the attributes or nodes 64a will likely include the corners of the mouth and the top and bottom edges of the lips. The number and detail of the attributes the user interface presents to the user for matching with the original image 66 depends on the scale and complexity of the object to be edited, since the smaller the object a lesser number of attributes are visible. In this regard, the sequence of prompting the user to match attributes of the model 62 and the object to be edited preferably starts with the matching of attributes that establish a scale of the object to be edited. The scale of the object determines the detail available in the image of the object to be edited and, therefore, can be used to automatically tailor the detail of the registration resulting from the sequence of the flashing dots.

After the sequence of flashing dots have been matched to the attributes of the object to be edited, the attributes 64 of the selected model 62 (i.e., the arcs 64b, regions 64c and the iterators 64d) are warped at step 107 to match the object based on the distance and scaling information obtained form the matching of the nodes 64a to the attributes of the image to be edited.

In order to tailor the amount of detail required for registering the object in the original image 66 to the model 62, the prompting of the user to locate nodes 64a in the original image preferably proceeds in a hierarchy that allows the size of the object to be determined early on in the registration process. Knowing the relative size of the object to be edited, the extent of the remaining registration process is tailored to reflect the amount of detail likely to be visible in the object to be edited. For example, the initial selection of nodes 64a is used to determine the overall scale of the object in the original image 66 and to determine what level of detail is appropriate in the projected attributes of the two-dimensional model 64. Also, locating the nodes 64a initially displayed to the user can constrain the possible positions of other nodes 64a, which can then be used to provide an indication of incorrect user inputs.

After the model 62 has been completely registered with an object in the original image 66, the particular editing technique from a linked tool 58 is automatically applied in steps 109 through 123. In the flow diagram of FIG. 3, the editing techniques are divided into two types or categories. A first type is described in steps 111 through 119, while a second type is described in step 121. In the first type of steps 111 through 119, an object is pasted over the original object in order to replace the original object in the image with a new object whose attributes are distinct from those of the original. Pasting and mapping of one image over a distinctly different image is typically called morphing—e.g., pasting an image of a first person's head onto a second person's body in the original image 66.

For morphing a head of one person onto the body of another in the original image 66, the user first registers, in steps 101 through 107, attributes of the face in the original image 66 with the projected two-dimensional attributes 64 of the selected model 62, which is a general face model. With the attributes of the face in the original image 66 registered to the model 62, the face is morphed into any other face that has been also registered with the same model. By using a model 62 in keeping with the invention, morphing does not require a tedious pixel-to-pixel matching for all pairs of images. Instead, once a face is registered with the model 62, it can be morphed to any other face in the same or another image that is also registered with that same model.

In step 111 of the flow diagram of FIG. 3, the user is prompted to select an object that will replace the registered object in the original image 66. If the selected replacement object is determined in step 113 to be also registered with the selected model, the pasting of the new object over the object in the original image 66 proceeds automatically at step 117. Otherwise, in step 115 the user is prompted to register the replace object to the selected model 62 in substantially the same manner described above in connection with steps 103 through 107. The registration of the model 62 with the original image 66 allows the area surrounding the pasted image to be sampled to determine such things as shading, color gradients and overall brightness of the original image 66. This information is then used in step 119 to control how the compositing of the substitute or morphed face is accomplished—e.g., the overall intensity of the pasted face is adjusted to match the surrounding areas, with portions along the boundary conditionally blended between the original image and the pasted image. At step 123, the edited image is sent to the frame buffer 46 for display of the edited image 68 on the display monitor 32.

As a separate category of image editing, step 121 of the flow diagram execute editing techniques for correcting imperfections or flaws in an object of the original image 66 registered to one of the models 62. Several types of image correction are based on using the pre-stored images 58a to cover up faulty image areas. With the pre-stored image 58a mapped into the original image 66, the arcs 64b, regions 64c and iterators 64d of the selected model 62 identify the pixels to which are applied blending and shading techniques by tools 58 in order to integrate the added image object into the larger image.

Registration of the area with the selected model 62 in steps 101 through 107 provides scaling and orientation information for mapping the pre-stored image 58a over the faulty image area. For example, to change eye color, the user is prompted in step 105 to manually register the attributes of the eye to the nodes 64a of the selected model 62—e.g., the corners of the eye, the mid point of the eyelid and the center of the eye. This information is sufficient to constrain an automatic application of a linked editing tool 58 to correct the eye color without risk of the color change going beyond the iris of the original eye image and into the eyelid. The selected eye model 62 is used to direct the sampling of portions of the original image 66 surrounding the iris for blending and shadows so the pasting of the new eye color is not done out of context with the rest of the face. In step 123 of the flow diagram of FIG. 3, the edited image 68 is transferred to the frame buffer 48 for display to the user on the display monitor 32.

Although image correction may involve pasting a replacement image over a flawed original object, it differs from morphing in that the replacement image is selected to have attributes similar to those of the flawed object so that the replacement image appears as the same object without the flaw or flaws. This type of image correction includes pasting an object into the original image 66 either to correct a part of the original image or to just add attributes to the original image without intending to cover an object of the original image. In step 121, the pasted image is assumed to be a pre-stored image 58a, but it may also be an image that the user has registered with the model 62. In this regard, in step 121 the user interface will prompt the user to register the replacement image if it is determined that the replacement image is neither a pre-stored image nor one that has been previously registered with the model 62. Once the pasting is accomplished, the replacement object is blended into the original image 66 in much the same manner as in step 119.

In step 121 Of the flow diagram of FIG. 3, image correction may simply involve the automatic application of editing tools to change facial tone, apply shadowing or apply digital makeup. In this regard, registration of a selected one of the models 62 with an object of an original image 66 can be used to control the area in which the effect of an editing tool 58 is applied.

Figure 4:
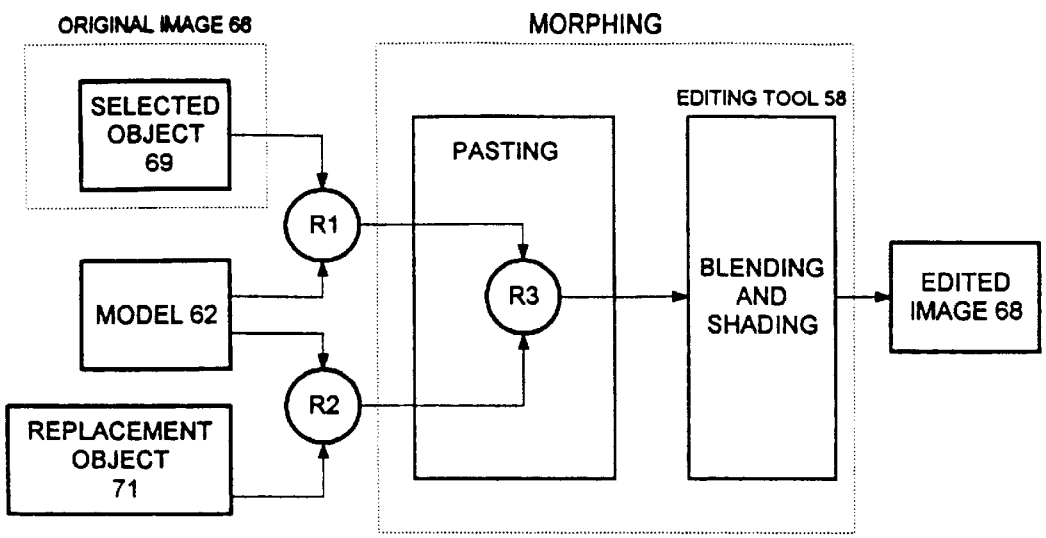
FIG. 4 is a block diagram illustrating the editing process in accordance with the invention for morphing a selected object in the original image to a different object by registering attributes of the two images to one another through a common selected model.
Figure 5:
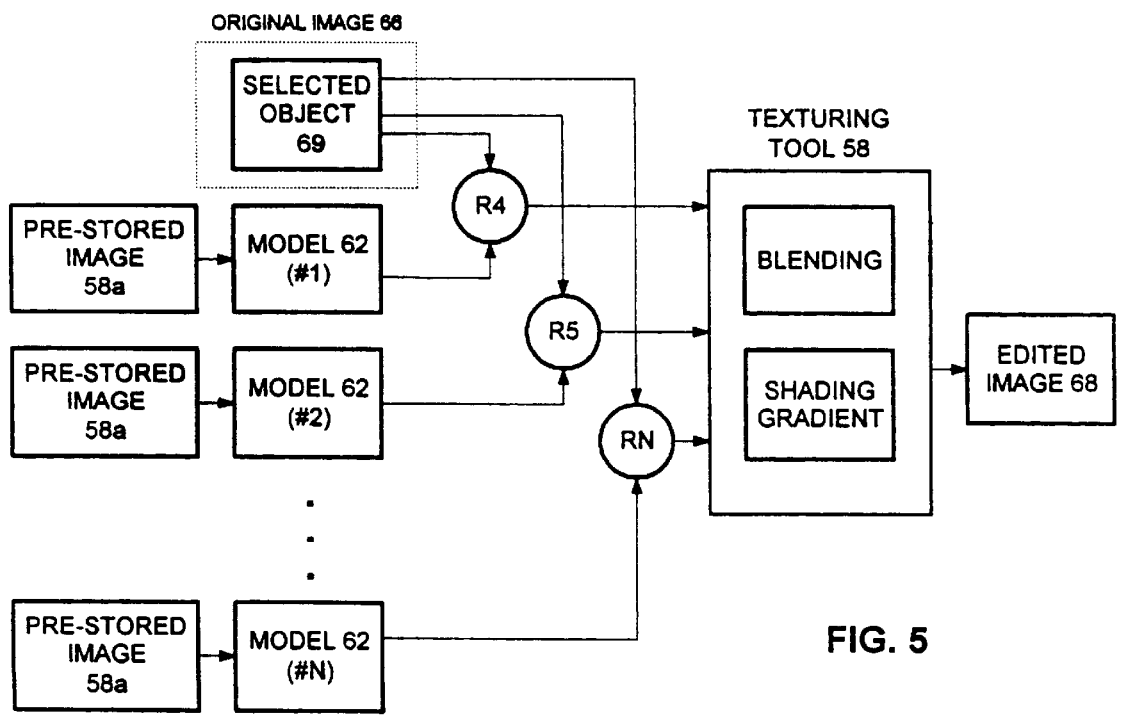
FIG. 5 is a block diagram illustrating the editing process in accordance with the invention to create a composite image, wherein the editing tool includes a pre-stored image linked to the model whose attributes are registered with attributes of the original image.

Regardless of the type of image editing, the invention registers one of the models 62 with an object to be edited. The registration process results in a data structure that maps grids containing the two-dimensional attributes 64 of the selected model 62 to the original image 66. Based on the mapping provided by the data structure, morphing or image correction techniques are automatically applied to selected pixels of the original image 66, which results in a new edited image 68. FIG. 4 is a block diagram illustrating the registration of an object 69 in the original image 66 and a replacement object 71 with one of the models 62 for the purpose of automatically executing a morphing of the object 69 into the replacement object 71. FIG. 5 is a block diagram illustrating the registration of the selected object 69 with one or more of the models 62 in order to provide a map for pasting one of the pre-stored images 68 into the original image 66 in order to achieve an editing effect that corrects a flaw in the original image 66.

In order to morph the registered object 69 in the original image 66 into the replacement image 71 in FIG. 4, two data structures R1 and R2 map the images to the model 62. Each of theses data structures R1 and R2 is created by the manual registration process described in connection with the flow diagram of FIG. 3. In order to paste the replacement object into the original image 66 in the correct pixel locations to overlay and cover the selected object 69 in the original image 66, a third data structure R3 is automatically generated, which is derived from the data structures R1 and R2. The data structure R3 provides a map for pasting the replacement object 71 into a copy of the original image 66, which results in a composited image that may be further edited by one of the editing tools 58 in order to blend the pasted object into the original image. The resulting image is the edited image 68.

In correcting a flaw in the original image 66 in keeping with the invention, an area of the image is mapped to one of the pre-stored images 58a that is then pasted over the flawed area and blended into the larger image, resulting in the edited image 68. Registration of the flawed area of the original image 66 to the pre-stored image 58a generates a data structure R4 as illustrated in the block diagram of FIG. 5 that maps the pre-stored image 58a to the flawed area. After the pre-stored image 58a is pasted into the original image based on the map derived from the registration process, editing tools 58 are applied to the composited image such as gradient extraction and filling, texture mapping, boundary blending, shading and compositing. As suggested by the block diagram of FIG. 5, the original image 66 may be registered to several ones of the models 62, with each of the models (62a and 62b in FIG. 5) providing a basis for automatically executing a desired editing effect on an area of the original image 66 identified by data structures such as R5 and R6 in FIG. 5.

Figure 6:
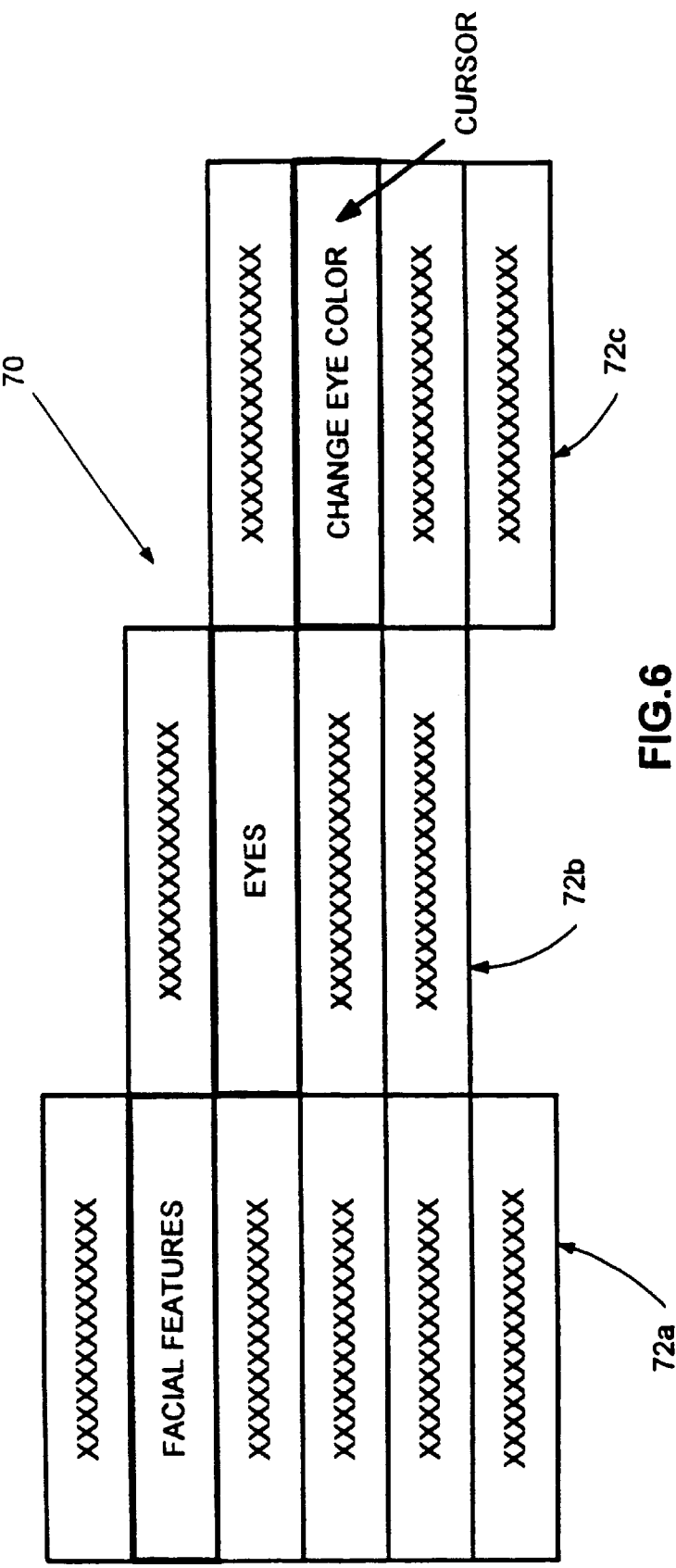

FIGS. 6 through 11 illustrate the process for correcting the color of an eye in a photograph in accordance with the invention. In keeping with the flow diagram of FIG. 3, the user first selects a model 62 by selecting the desired editing effect. In order to select one of the models 62, the library 56 of the models is organized by categories in a hierarchical arrangement. FIG. 6 illustrates an example of a user interface 70 for selecting a desired editing effect that is executed by a editing tool 58 linked to one of the models 62 in the library 56. The exemplary user interface 70 is a series of menus 72a–72c in a cascaded arrangement. In FIG. 6, the user has selected "facial features" from a main menu 72a, which opens a secondary menu 72b listing specific facial features or attributes that can be edited. The user has selected "eyes," which opens a tertiary menu 72c that lists specific editing functions for the eye. The selected editing function "change eye color" is linked to one of the three-dimensional models 62, which in turn is linked to one or more editing tools 58.

Figure 7:
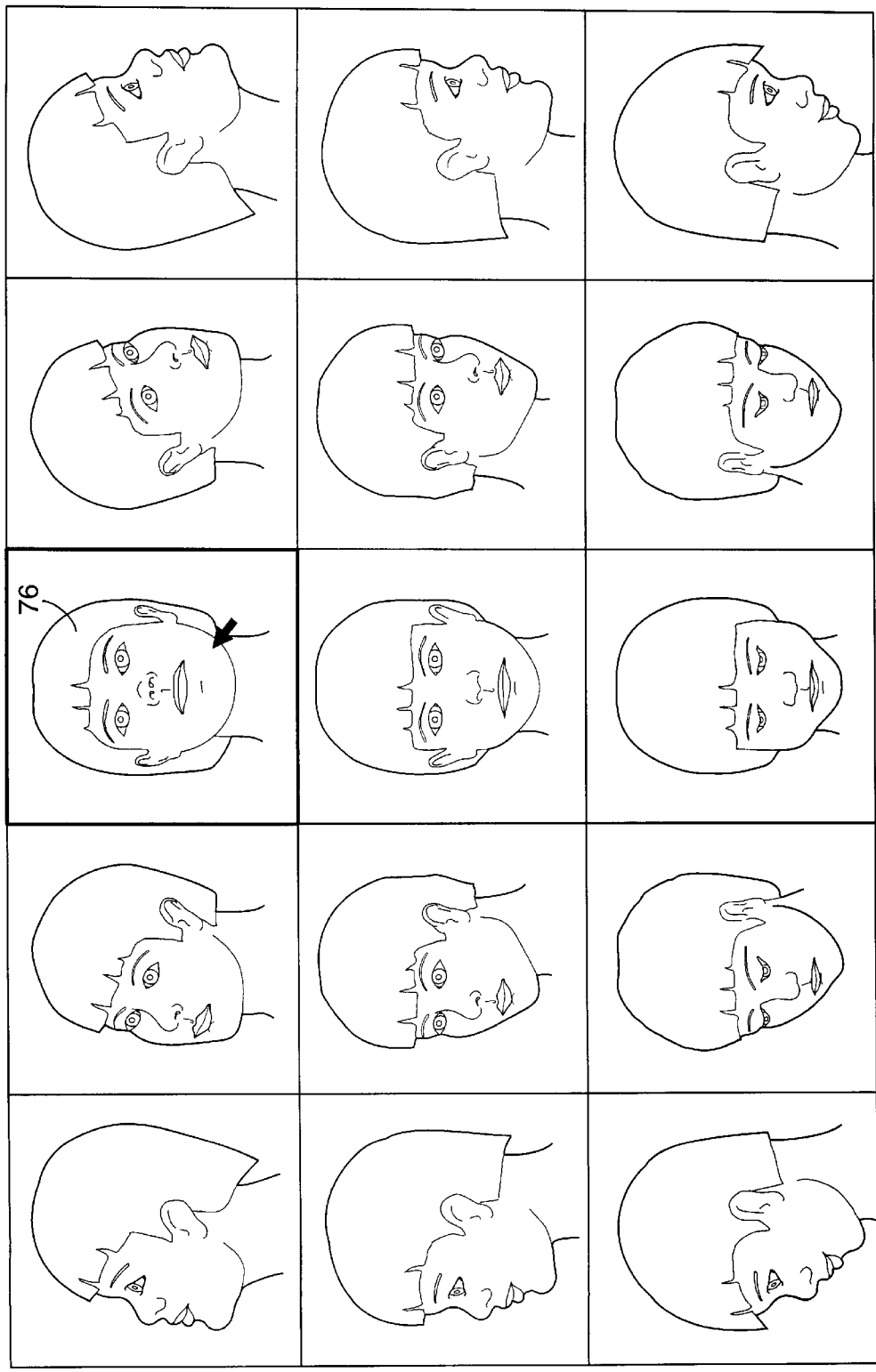

After the model 62 and editing tool 58 are selected, the user interface displays a matrix of available ones of the two-dimensional projections 64 in order to prompt the user to select an appropriate one of the projections that best matches the orientation of the eye in the original image 66. FIG. 7 illustrates an example of the matrix 74 in which an image of a head 76 is shown in a number of different orientations. Each of these orientations of the head 76 in the matrix 74 of FIG. 7 is a representation of one of the two-dimensional projections 64 of the three-dimensional model 62 that includes nodes 64a, arcs 64b, regions 64c and iterators 64d for the model of the eye. Preferably, the number of different orientations 76 displayed in the matrix 74 is greater then that illustrated. Also, the model 62 may be extremely general and lacking in any detail of two-dimensional attributes outside of the attribute of interest, which in the illustrated example are the eyes. In this regard, the eyes may be illustrated in different positions such as opened or closed for the same head position as a mechanism for using the feature to be edited as a parameter for selecting the model that best fits the original image to be edited. Alternatively, the matrix 74 may display only the eye in various orientations, but an isolated view of only the eye taken out of context with the rest of the face is not as easily matched to the orientation of the eye in the original image 66.

Figure 8:
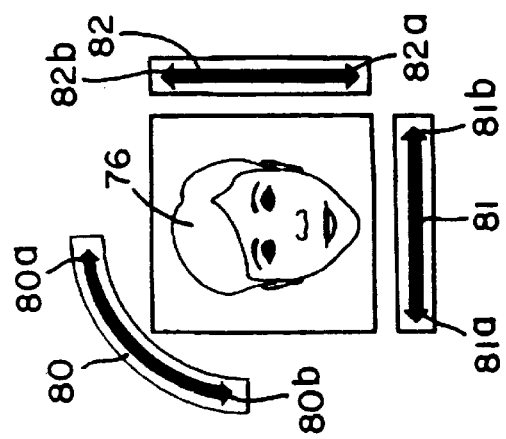

A further alternative to the matrix 74 of FIG. 7 is illustrated by the user interface of FIG. 8. Instead of simultaneously displaying numerous alternative orientations and attributes detailed in a matrix layout as illustrated in FIG. 6, the user interface 78 of FIG. 8 displays to the user only a single orientation or view of the three-dimensional model 62. Different ones of the two-dimensional projections may be displayed and selected by manipulation of the arrows 80, 81 and 82. Each of the arrows 80, 81 and 82 controls rotation of the head 76 about one of the three axes x, y and z in a Cartesian coordinate system. The projections 64 are divided into three groups, each of which includes all of the two-dimensional model attributes for projections into one of the three planes (xy, xz and yz) of the Cartesian coordinate system. Thus, the mouse 30 may be used to move a cursor and click on one of the two arrow heads 80a or 80b of arrow 80, which switches the display among various ones of the two-dimensional projections 64 in one of the three groups that causes the head to rotate in the plane of the paper. In order to move the head 76 to the left or right, the mouse 30 is used to move the cursor and click on one of the two arrow heads 81a or 81b of the arrow 81. The head 76 is rotated up or down in FIG. 8 by clicking on the top or bottom arrow heads 82a or 82b, respectively, of the arrow 82.

Figure 9:
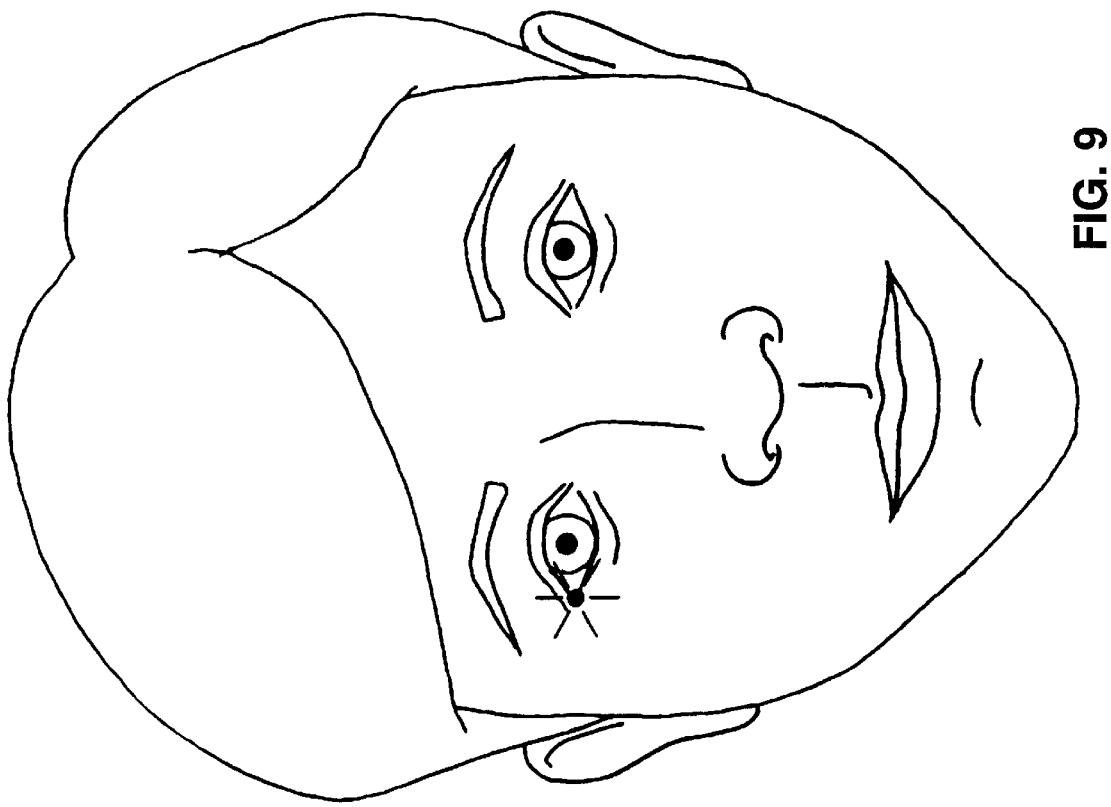

After the user selects the two-dimensional projection of attributes 64 of the model 62 that best aligns with the object to be edited, the user is prompted to manually register key attributes of the projection with like attributes in the object to be edited, which in the illustrated embodiment is an eye. FIG. 9 illustrates the two-dimensional model 64 that has been selected by the user for registration with an object in the original image 66. In this user interface display of the selected model 64, each of the nodes 64a is displayed in a predetermined sequence. For purposes of illustration, only the first one of the sequentially displayed nodes 64a is shown in FIG. 9. Each one of the nodes 64a is displayed at a location of a attribute on the model that is to be manually registered with the object to be edited in the original image 66. The order of the sequence of the displaying of the nodes 64a is arranged so that the first few nodes identify the scale of the original object, which is to be edited. Depending on the size of the original object to be edited, the number of attributes the user is asked to identify in the original image 66 by responding to the sequential display of nodes 64a is tailored to complement the number of attributes discernible in the object to be edited.

After the user has identified all of the locations of attributes in the object to be edited in response to the prompting by the sequential display of the nodes 42a, the arcs 64b, regions 64c and iterators 64d are automatically mapped to the object to be edited based on the locations of the nodes 64a. With the two-dimensional attributes 64 of the model 62 completely mapped to the object to be edited, the editing tool 58 automatically edits the object based on the identification of certain pixels in the image 66 with the attributes 64 of the model 62.

Figure 10:
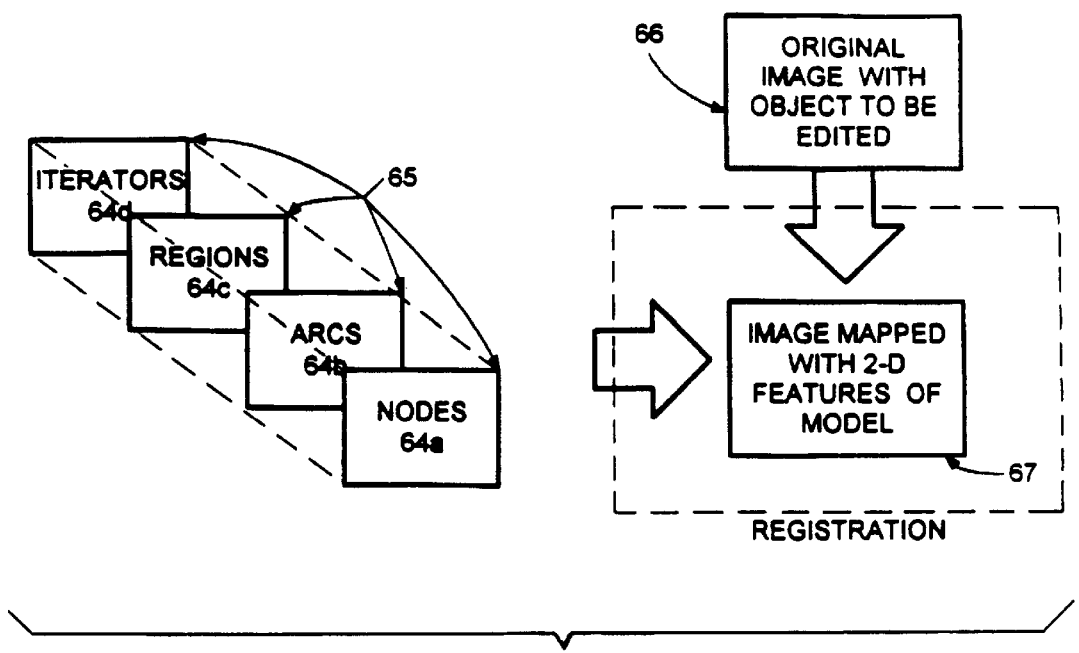
FIG. 10 is a schematic representation of several two-dimensional grids describing the attributes of a selected model, where the grids are pictured in a layered arrangement to suggest their interrelationship and mapped to a selected object in an original image to form a new image that is edited in accordance with an editing tool linked to the model.

Referring to FIG. 10, the two-dimensional attributes 64a through 64c of the selected model 62 are represented in a relational network embedded in a deformable coordinate grid. This grid is deformed by piecewise, interpolated mapping functions to register an object in the image to the nodes 64a as described with respect to the flow diagram of FIG. 3 and the exemplary user interfaces of FIGS. 6–9. When the registration to the original image is complete, a new image 67 is created in the memory system 26 that is an intermediate image between the original image and the edited image 68. The editing tools 58 are applied to the pixels of this intermediate image based on the two-dimensional attributes 64 of the model 62 mapped into the image by the registration process.

Figure 11:
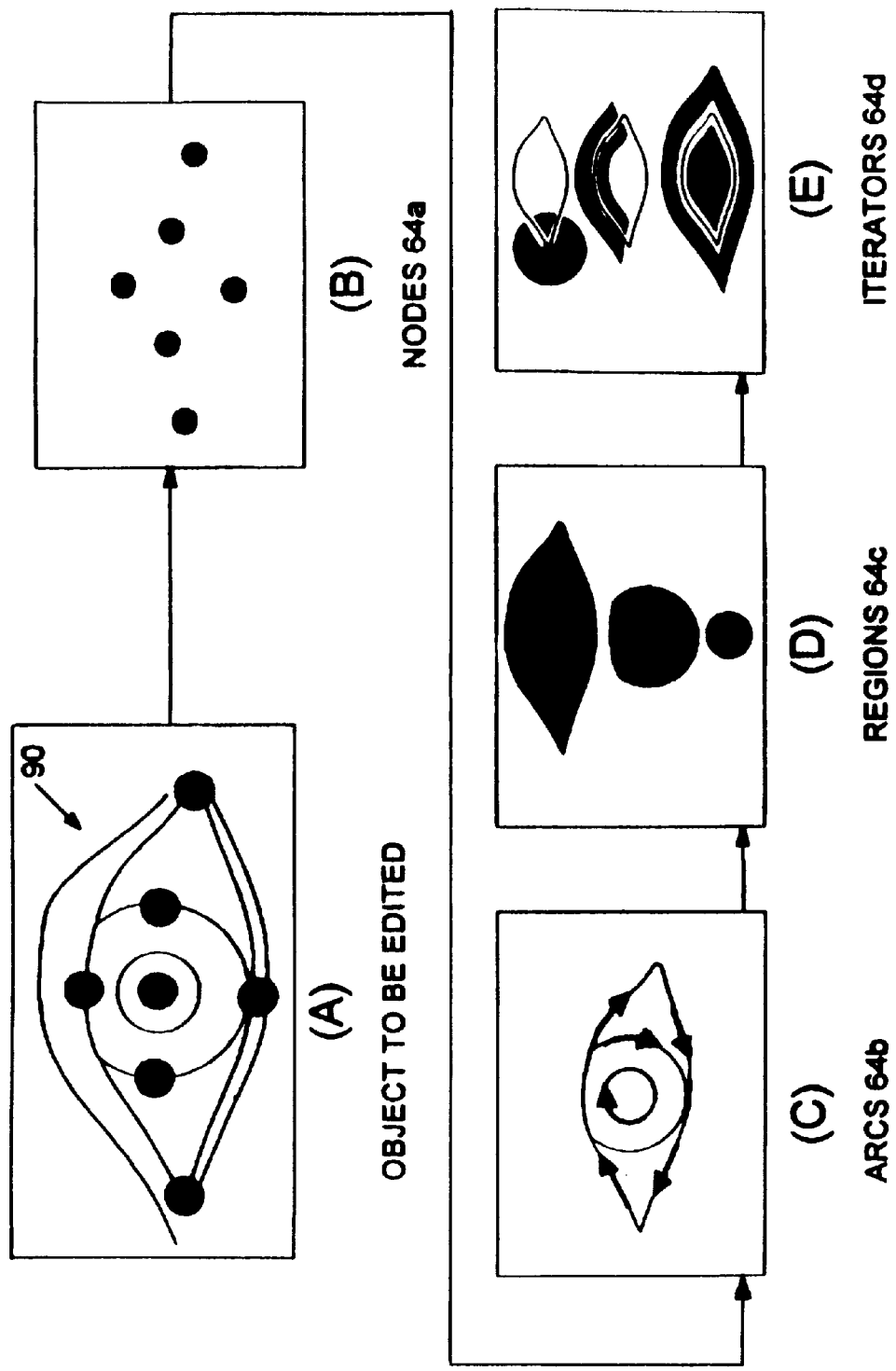
FIG. 11 is sequence of schematic illustrations demonstrating the process of registering an object to be edited with two-dimensional attributes of the selected model.

FIG. 11 illustrates the linked relationship among an eye 90 to be edited in the original image 66 and the two-dimensional attributes 64 of the model 62 selected in FIGS. 6 through 9. In keeping with the registration process of the invention, the user is prompted to mark the locations of attributes of the eye 90 identified by the nodes 64a of the two-dimensional attributes 64. Each of the locations of the attributes is marked by moving a cursor to a location of the on-screen image of the eye 90 that matches the attribute of the model eye 62 marked by the flashing dot as illustrated in FIG. 9. A mouse click with the cursor in the appropriate position marks the eye and completes the registration for one of the nodes 64a. In the illustration of FIG. 11 (A), the registration process is completed and the eye 90 has been marked to locate the seven (7) attributes identified by the nodes 64a, which are illustrated in FIG. 11 (B). Because the relationship among the two-dimensional attributes 64a–64d is pre-established, the registration of the nodes 64a to the eye 90 also registers to the eye the arcs 64b, the regions 64c and the iterators 64d as suggested by the illustrations of FIGS. 11(C),(D) and (E), respectively.

Often an object to be edited in the original image 66 is partially occluded. In these situations, the prompting of the user to register the selected model with the selected object includes a step of marking the occlusion, which enables the location of the occlusion to be identified and isolated during the editing process so that the editing process does not cause a replacement object to be pasted over the occlusion.

Instead, the invention provides for the marked occlusion to be copied and pasted down over the corrected image in order to ensure the corrected image maintains the spatial relationship of the overlap established by the occluding object in the original.

Figure 12A:
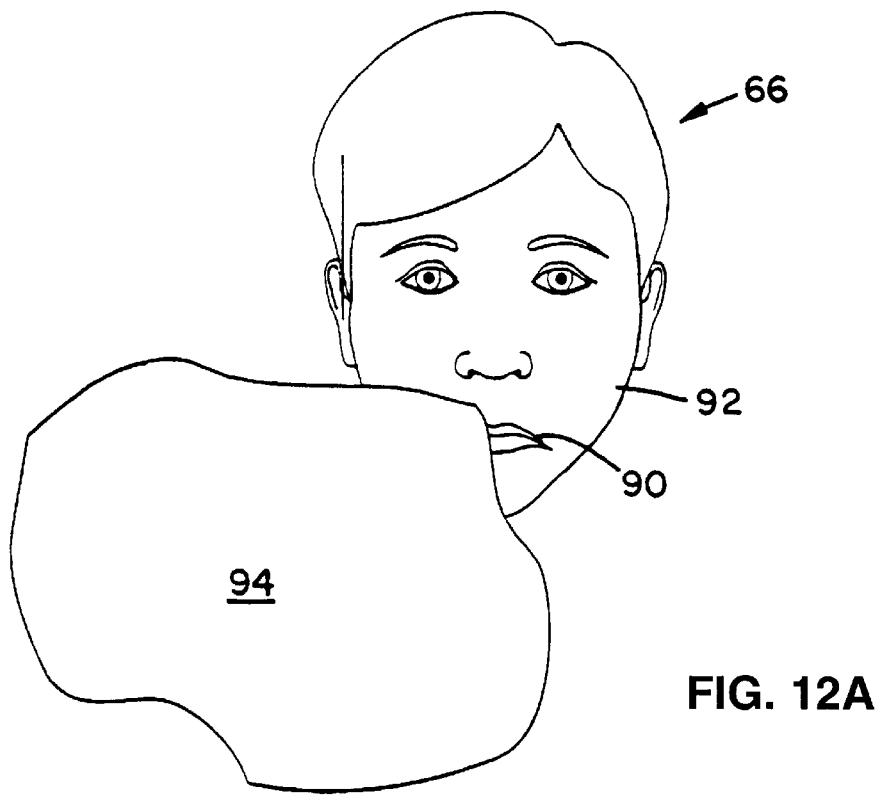
FIGS. 12a illustrates an example of a digital image in which the feature to be edited, the mouth, is partially occluded.
Figure 12B:
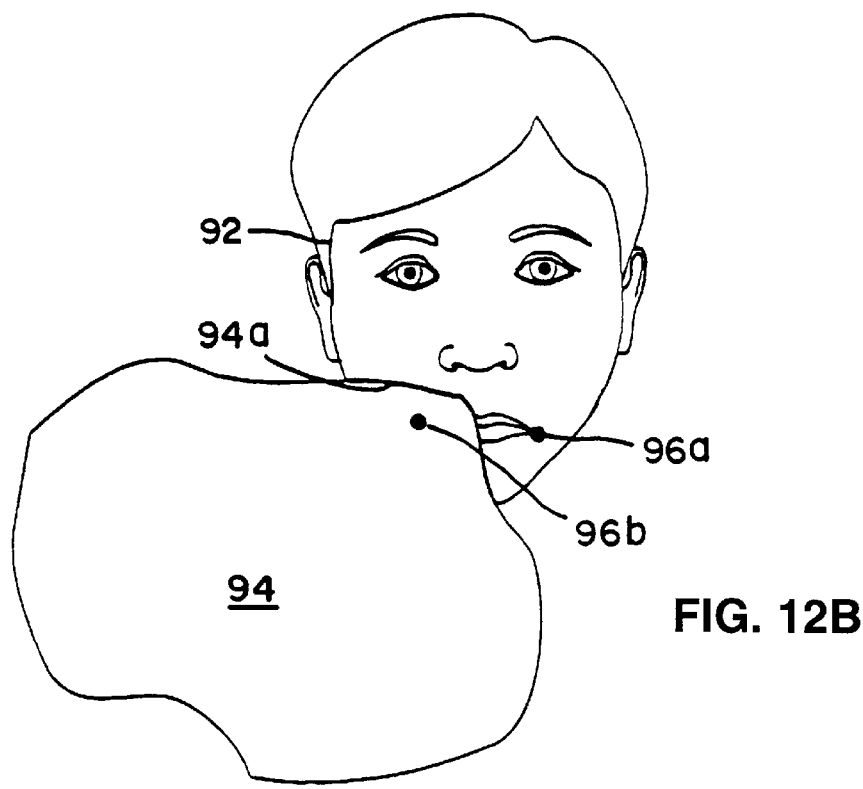
FIG. 12b illustrates the digital image of FIG. 12a where the user has marked attributes of the mouth to be edited in response to prompting from the model in keeping with the approach of FIGS. 7–9, but with the additional marking of the image to identify the area of the occlusion.

An example of an original image with an object to be edited that is partially occluded is illustrated in FIG. 12a, which shows the mouth 90 of a person's head 92 partially occluded by an overlaying object 94. In the illustration of FIG. 12a, the attributes of the mouth 90 suggest the person is frowning. In keeping with the invention, the attributes of the mouth 90 can be automatically corrected so that the person appears to be smiling or at least not frowning. The editing process proceeds exactly as previously described in connection with FIGS. 1 through 11. In registering the attributes of the mouth 90 to one of the models 62, which has been identified from the selection of the editing technique using the menu of FIG. 6, the user may be prompted to locate an attribute in the original image 66 that is hidden by the occlusion. Such a situation is illustrated in FIG. 12b, where the user has been prompted by flashing dots on attributes of the selected model (not shown) to locate the corners of the mouth 90. One of the corners is visible and the user has marked the corner with a dot 96a. The other corner of the mouth, however, is hidden by the occlusion. In response to the prompting of the registration process requesting the user register the other corner of the mouth 90 to the model 62, the user has marked with a dot 96b an area of the occlusion 94 that approximates where the corner of the mouth is located under the occlusion.

In order to identify the occlusion 94, the prompting process concludes with a request that the user identify any object occluding the object (in this case a mouth) that has been registered to the model 62 for editing. The prompt can be a simple text display on the display monitor 32 that is automatically generated after the last one of the nodes 64a is registered to the object to be edited. Other types of user interfaces may also be used as long as they prompt the user to identify any occluding object. In the illustrated embodiment of FIG. 12b, the user has been prompted to mark the border of the occluding object 94 in the area where it overlays the mouth 90.

In the illustrated embodiment of FIG. 12b, the user has traced a portion of the border of the occlusion 94 using a conventional technique of moving a mouse-controlled cursor along the portion of the border that the user wants to identify, which is the portion 94a of the border that overlays the mouth 90. The user may be further prompted to identify which side of the border 94a is inside the occlusion 94 in order to give the editing process enough information to automatically identify and isolate the area of the occlusion that is then copied to a separate memory location for later pasting over the pasted replacement object. Alternatively, the editing process of the invention may include a process for identifying attributes of the image areas adjacent the marked border 94a in order to automatically determine which side of the border is inside the occlusion 94.

Figure 13A:
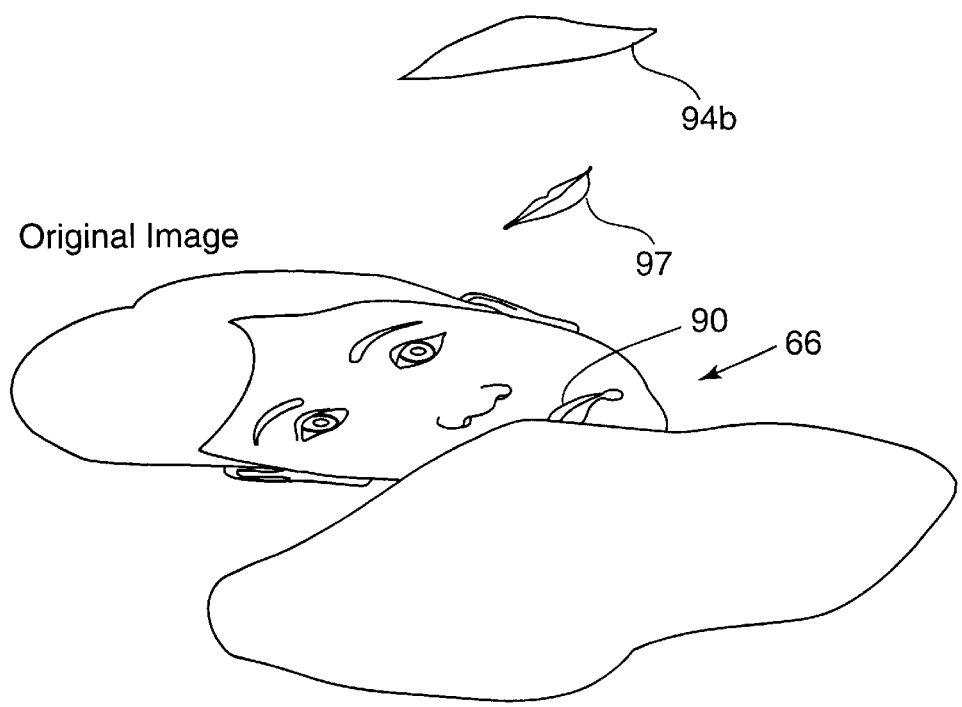
FIGS. 13a and 13b are illustrations representing the process and associated data structures for correcting the partially occluded mouth of FIGS. 12a and 12b in accordance with the invention.
Figure 13B:
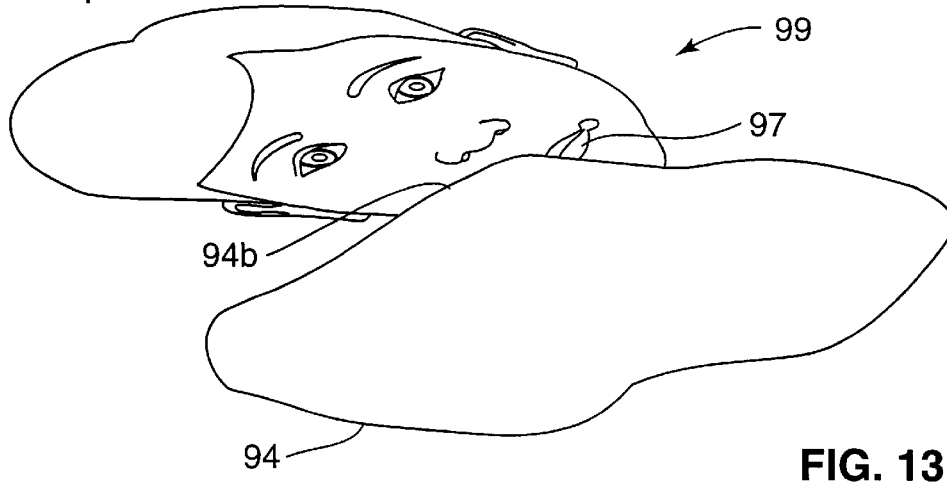

Once the area of the occlusion 94 is identified, the editing process proceeds automatically as described above. However, the process copies the occlusion 94 in the memory system 26 for later pasting over a replacement mouth so that the replacement mouth appears occluded in the same way as did the original image of the mouth. In the illustration of FIG. 13a, the replacement mouth 97 is one of the pre-stored images 58 mapped to the original image 66 through the selected model 62 and the copied occlusion 94b is a separate image that is directly mapped to the original image. In the illustration of FIG. 13b, only a portion of the occlusion has been copied into a separate memory location for pasting over the replacement mouth 97. This portion is either identified manually by the user continuing the tracing 94a to form a closed path that defines a portion of the occlusion that covers the mouth 90 or the portion can be determined automatically based on criteria of the attributes of the occlusion 94 and the position and scale of the registered model. The composited correction to the original image 66 that creates the edited image 68 is created by first pasting the replacement mouth 97 over the original mouth 90 and then pasting the copied portion 94b of the occlusion 94. The result of this sequential pasting is the composited image 99 illustrated in FIG. 13b, which may be further edited by a texturing tool to blend the replacement mouth 97 into the surrounding area of the composited image in order to create the final edited image 68.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of the invention. Rather, we claim as our invention all such embodiments as may come within the scope of the following claims and equivalents thereto.

We claim:

1. A method for automatically editing digital images comprising the steps of: selecting for editing an object within an original image; selecting a model from a library of models that best matches the selected object; prompting a user to register the selected object with the selected model; storing information mapping attributes of the selected model to the selected object; and, transforming the original image to an edited image by automatically applying one or more editing tools to the selected object based on the mapped attributes of the selected model.

2. The method of claim 1 wherein the step of transforming the original image to the edited image includes a step of pasting a replacement object over the selected object of the original image, where placement of the pasted replacement image into the original image is constrained by the registration between the selected object and model.

3. The method of claim 2 wherein the replacement object has attributes of a same type as those of selected model and object, but the attributes of the replacement object am visually distinct from the attributes of the selected object so that the pasting of the replacement object over the selected object results in an appearance of the selected object being morphed to a different visual appearance.

4. The method of claim 2 wherein the editing tools include gradient extraction and filling, texture mapping, boundary blending, shading and compositing.

5. The method of claim 2 wherein the replacement object is a pre-stored image linked to the editing tools.

6. The method of claim 1 wherein the step of prompting the user to register the selected object with the selected model includes the steps of (1) displaying nodes of the model whose locations represent locations of the attributes in the model that are to be mapped to the selected object and (2) the user identifying locations of attributes of the selected object corresponding to the locations of the attributes of the model, which are identified by the nodes.

7. The method of claim 1 wherein the step of selecting a model from the library of models includes the step of identifying an editing effect to be performed on the selected object.

8. The method of claim 1 wherein the step of registering the selected object with the selected model includes the steps of initiating the registration by first selecting attributes indicating the size of the image; determining from the size of the selected object the amount of detail in the selected object likely to be discernible by the user; and tailoring the number of attributes of the model the user is prompted to match to the selected object so as to complement the likely amount of visual detail in the selected object to be edited.

9. The method of claim 1 including wherein each of the models has two and three dimensional attributes.

10. The method of claim 9 wherein the two-dimensional attributes of the selected model are registered with the selected object of the original image and warped to fit the size and orientation of the selected object established by the registration.

11. The method of claim 10 wherein the two-dimensional attributes of each of the models are embedded in one or more grids, which include (1) nodes that correspond to locations of attributes of the selected model that the user interactively registers to pixel locations in the original image that represent like attributes of the selected object, (2) arcs that describe piecewise splines of the model, (3) regions of the model defined by closed paths of the arcs and (4) iterators, which describe areas surrounding the nodes, arcs and regions for blending or texturing.

12. The method of claim 1 wherein the registration of the selected object with the selected model includes the step of marking an object that occludes the image to be edited.

13. A computer system comprising; a library of object models; a data structure for recording the registration of one of the models from the library with an object selected from an original image displayed on a user interface; an editing tool associated with the model; a processor for applying the editing tool to the selected object based on the registration of the selected object to the selected model; and, a display memory containing an edited image resulting from a transformation of the original image by the editing tool.

14. The computer system of claim 13 wherein the editing tool is registered to the selected model, which in turn is registered to the selected object to be edited in the original image.

15. The computer system of claim 14 wherein the editing tool includes a pre-stored image for pasting over the selected object in the original image.

16. The computer system of claim 14 wherein the selected object is a first object and the computer system includes a data structure mapping attributes of the selected model to a second object for constraining the pasting of the second object over the first object, where the editing tool includes a technique for blending the pasted second object into a original image.

17. The computer system of claim 14 wherein the editing tool include gradient extraction and filling, texture mapping, boundary blending, shading and compositing.

18. The computer system of claim 16 wherein the registered attributes of the second object are visually distinct from the registered attributes of the first object, resulting in the appearance of the first object being morphed in to the second object when the second object is pasted over the first object.

19. The computer system of claim 13 including means for creating the data structure by prompting the user to register the selected object with the selected model, where the prompting includes (1) displaying nodes of the selected model whose locations represent locations of attributes common to all images that are properly matched to the model and (2) recording the locations in the original image of attributes of the selected object identified by the user in response to the displayed nodes.

20. The computer system of claim 13 wherein the library of models is indexed to a menu of editing effects displayed to the user for the purpose of selecting the appropriate one of the models from the library for registering with the selected object.

21. The computer system of claim 13 wherein the data structure for registering the selected model with the selected object maps attributes of the model to pixels of the original image.

22. The computer system of claim 13 wherein each of the models comprises a data structure defining a three-dimensional model from which two-dimensional attributes are derived for registering with the selected object in the original image.

23. The computer system of claim 22 wherein the two-dimensional attributes include one or more two-dimensional grids containing nodes of the model that define locations of attributes of the model in a two-dimensional projection of the three-dimensional model.

24. The computer system of claim 23 including means for displaying the nodes in a sequence for prompting the user to interactively register each of the nodes with one of attributes of the selected object in the original image.

25. The computer system of claim 13 wherein the selected model includes a two-dimensional grid containing (1) nodes demarking locations of selected attributes of the model, (2) arcs that describe piecewise splines of the model, (3) regions of the model and (4) iterators, which describe areas surrounding the nodes, arcs and regions for constraining the application of blending or texturing tools to the original image.

26. The computer system of claim 13 including a copy of an object occluding the object to be edited, where the copy is pasted over the pre-stored image.

27. In a computer for receiving and displaying digital images, an article of manufacture comprising; a medium that is readable by the computer and that carries instructions for the computer to perform a process comprising the steps of: selecting in an original image an object to be edited; selecting from a library of models a model that is linked to an editing tool for the desired editing effect to be applied to the selected object; registering attributes of the model with the same attributes of the selected object; automatically applying the editing tool to the selected object based on a mapping of the attributes of the selected model to the selected object to create an edited image, which is the original image modified to include the desired editing effect resulting from the application of the editing tool to the selected object; and, displaying the edited image in place of the original image.

28. The article of manufacture of claim 27 wherein the step of registering the selected object with the selected model includes the step of prompting a user to register the model with the selected object at two or more nodes of the model that represent attributes common to all objects that are properly matched to the model.

29. The article of manufacture of claim 27 wherein the step of prompting the user to register the selected object with the selected model includes the steps of (1) displaying nodes of the model whose locations represent locations of attributes common to all images that are properly matched to the model and (2) identifying locations of attributes of the selected object corresponding to the attributes of the model represented by the displayed the nodes.

30. The article of manufacture of claim 27 wherein the editing tool is registered to the selected model, which in turn is registered to the selected object to be edited in the original image.

31. The article of manufacture of claim 30 wherein one of the editing tools includes a tool for pasting a pre-stored image over the selected object in the original image, where the pre-stored image is part of the editing tool.

32. The article of manufacture of claim 27 wherein the selected object is a first object and the article includes a data structure for registering the model to a second object, which enables the second object to be pasted over the first object, where the editing tools include tools for blending the pasted second object into the original image.

33. The article of manufacture of claim 31 wherein the editing tool includes a texturing tool for blending the pasted, pre-stored image into the original image to create an edited image.

34. The article of manufacture of claim 32 wherein attributes of the second image registered to the selected model are visually distinct from attributes of the first object that are registered to the model, resulting in the appearance of the first object being morphed into the second object when the second object is pasted over the first object.

35. The article of manufacture of claim 27 wherein the models in the library of models are indexed to a menu of editing effects, which is displayed to the user for selection of the desired editing effect.

36. The article of manufacture of claim 27 including initiating the registration of the selected object with the model by first registering attributes of the model and the selected object that indicate the size of the selected object; and tailoring any additional registration of attributes of the model and the selected object to complement the likely amount of detail visually discernible to the user based on the size of the selected object.

37. The article of manufacture of claim 27 including wherein each of the models has two and three dimensional attributes.

38. The article of manufacture of claim 37 wherein the two-dimensional attributes of the model are first registered with the selected object and then warped to complement the shape and orientation of the selected object.

39. The article of manufacture of claim 37 wherein the two-dimensional attributes of each of the models are embedded in one or more grids and include (1) nodes that mark the locations of attributes in the model which are mapped to attributes in the selected image during the registration process, (2) arcs that describe piecewise splines of the model, (3) regions of the model and (4) iterators, which describe areas surrounding the nodes, arcs and regions for constraining the application of blending or texturing tools to the original image.

40. The article of manufacture of claim 27 wherein the registration of the selected object with the selected model includes the step of marking an object that occludes the image to be edited.

* * * * *

UNITED STATES PATENT AND TRADEMARK OFFICE
CERTIFICATE OF CORRECTION

PATENT NO. : 5,990,901

DATED : November 23, 1999

INVENTOR(S) : Lawton, et al.

It is certified that error appears in the above-identified patent and that said Letters Patent is hereby corrected as shown below:

On The Title Page:

In Section [56] References Cited, OTHER PUBLICATIONS, Column 1, line 34: Please add quotation marks around "Remove Red Eye from a Photo"

In Column 9, line 5: "replace" should read --replacement--.

In Column 13, line 22: "comers" should read --corners--.

In Column 13, line 24: "comers" should read --corners--.

In Column 13, line 27: "comers" should read --corners--.

In Column 13, line 29: "comers" should read --corners--.

UNITED STATES PATENT AND TRADEMARK OFFICE
CERTIFICATE OF CORRECTION

PATENT NO. : 5,990,901
DATED : November 23, 1999
INVENTOR(S) : Lawton, et al.

It is certified that error appears in the above-identified patent and that said Letters Patent is hereby corrected as shown below:

In Claim 3, Column 14, line 56: "am" should read --are--.

In Claim 13, Column 15, line 40: "comprising;" should read --comprising:--.

In Claim 16, Column 15, lines 61-62: "a original" should read --an original--.

In Claim 27, Column 16, line 49: "comprising;" should read --comprising:--.

In Claim 37, Column 18, line 14: "two and three dimensional" should read --two- and three- dimensional--.

Signed and Sealed this

Third Day of April, 2001

Attest:

NICHOLAS P. GODICI

*Attesting Officer*     *Acting Director of the United States Patent and Trademark Office*